(12) United States Patent
Carter

(10) Patent No.: US 8,616,363 B1
(45) Date of Patent: Dec. 31, 2013

(54) MACHINE FOR STACKING SPLIT FIREWOOD

(76) Inventor: Robert J. Carter, Rogersville, MO (US)

(*) Notice: Subject to any disclaimer, the term of this patent is extended or adjusted under 35 U.S.C. 154(b) by 288 days.

(21) Appl. No.: 13/068,957

(22) Filed: May 24, 2011

Related U.S. Application Data

(60) Provisional application No. 61/396,242, filed on May 24, 2010.

(51) Int. Cl.
  *A23G 7/00* (2006.01)
  *B65B 35/56* (2006.01)
  *B65B 35/00* (2006.01)
  *B65G 47/244* (2006.01)
  *B65G 47/24* (2006.01)

(52) U.S. Cl.
  USPC ...... 198/397.04; 222/369; 198/658; 198/408; 414/758

(58) Field of Classification Search
  USPC .......... 198/404, 416, 443, 658; 222/368, 369; 414/149, 792.7, 793.9; 62/381
  See application file for complete search history.

(56) References Cited

U.S. PATENT DOCUMENTS

| | | | |
|---|---|---|---|
| 1,985,462 A | 12/1934 | Schapiro | 144/192 |
| 3,939,762 A | 2/1976 | Smitherman et al. | 100/4 |
| 4,219,057 A | 8/1980 | Falk | 144/3 K |
| 4,410,177 A | 10/1983 | Richardson | 473/94 |
| 4,461,380 A * | 7/1984 | Grikis | 198/389 |
| 4,875,514 A | 10/1989 | Hollister | 144/367 |
| 4,949,962 A | 8/1990 | Gretzky | 273/43 E |
| 5,243,901 A | 9/1993 | Green | 100/7 |
| 6,564,925 B1 * | 5/2003 | Cadwallader et al. | 198/443 |
| 7,108,155 B2 * | 9/2006 | Kelbert et al. | 221/167 |
| 7,168,909 B2 * | 1/2007 | Irwin et al. | 414/788.2 |
| 7,475,524 B2 | 1/2009 | Bordignon et al. | 53/435 |
| 7,591,732 B2 | 9/2009 | Speigl | 473/73 |
| 2006/0185961 A1 * | 8/2006 | Stibbard | 198/404 |

FOREIGN PATENT DOCUMENTS

| | | | | |
|---|---|---|---|---|
| FR | 2631008 A1 * | 11/1989 | | B65G 47/14 |
| JP | 57098409 A * | 6/1982 | | B65G 47/14 |

* cited by examiner

*Primary Examiner* — Gregory Adams
(74) *Attorney, Agent, or Firm* — Jonathan A. Bay

(57) ABSTRACT

Apparatus for stacking sticks of split-firewood has a drum with interior flights as well as a ramp and chute which do not rotate with the drum. The flights partition the inside wall of the drum into a procession of shelves and pockets. Each shelf extends radially between the drum sidewall and an inner edge. The ramp is mounted inside the drum and has an axially extending upper edge disposed to be spaced by a small gap from the shelf edges at about 9 o'clock relative clockwise rotation of the drum. The chute is also mounted partly inside the drum slopes from a top to a discharge end. The chute is mounted relative to the ramp to form a catch zone for sticks sliding off the ramp inside the drum. The chute furthermore extends outside the drum to discharge sticks of split firewood in neat stacks there.

12 Claims, 4 Drawing Sheets

MACHINE FOR STACKING SPLIT FIREWOOD

CROSS-REFERENCE TO PROVISIONAL APPLICATION(S)

This application claims the benefit of U.S. Provisional Application No. 61/396,242, filed May 24, 2011.

BACKGROUND AND SUMMARY OF THE INVENTION

The invention relates to a machine for stacking split firewood and, more particularly, to a machine for accepting an input of randomly-oriented sticks of split-firewood and outputting neat stacks or bundles thereof. The output of such a split-firewood stacking machine can thereafter be inputted to, for example and without limitation, a bundling machine (not shown) as for wrapping the bundle of stacked sticks with shrink wrap or the like for further transit in commerce in that form.

A number of additional features and objects will be apparent in connection with the following discussion of the drawings and preferred embodiment(s) and example(s).

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
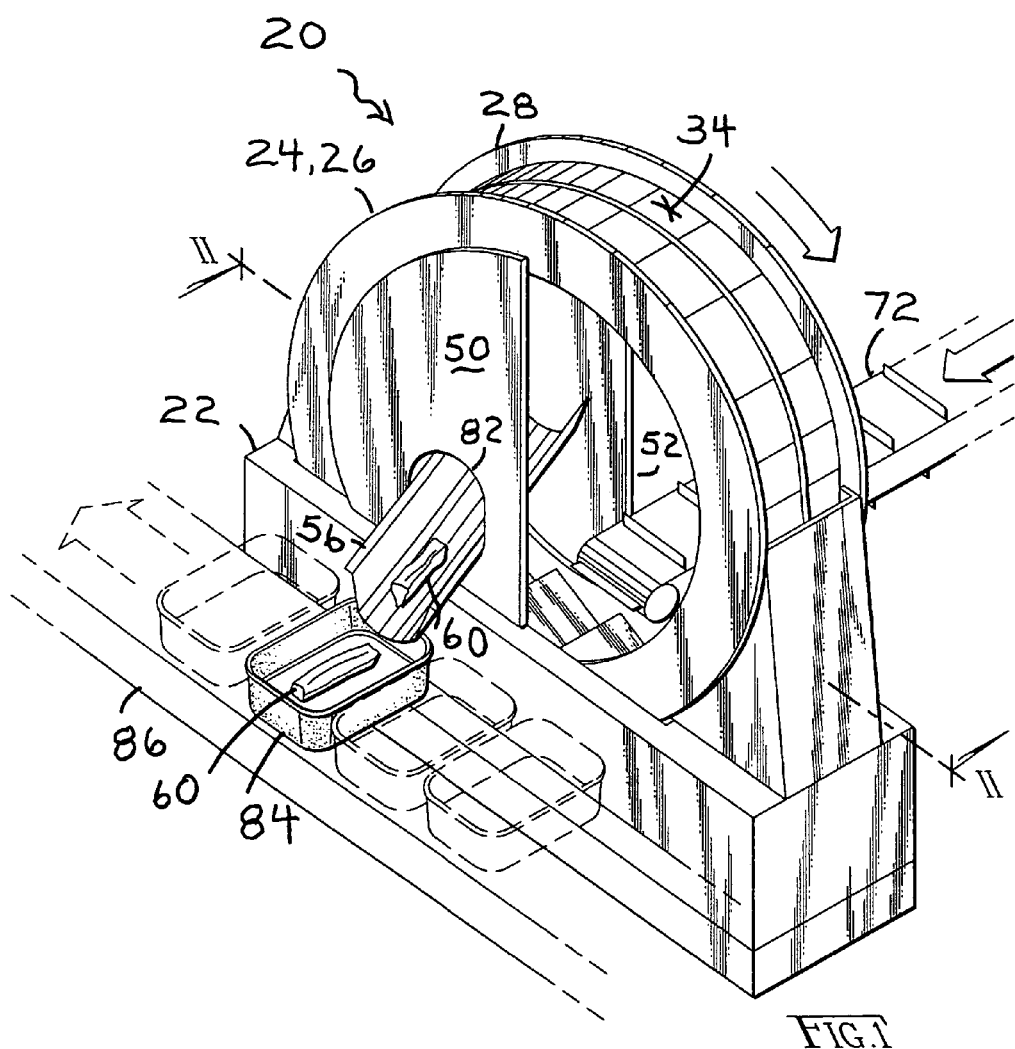
FIG. 1 is a perspective view of a machine in accordance with the invention for stacking split firewood.
Figure 2:
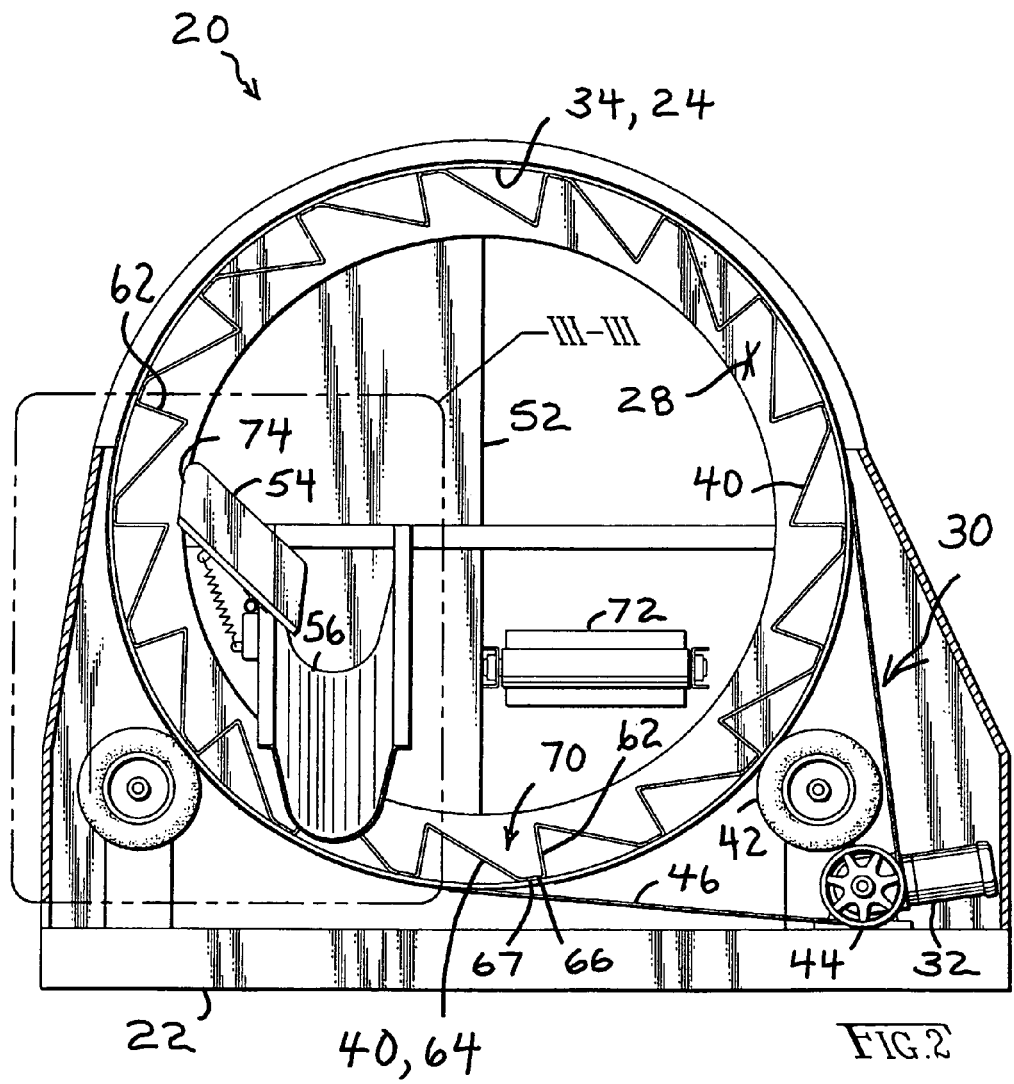
FIG. 2 is an elevational section view taken through line II-II in FIG. 1.

FIGS. 1 and 2 shows the 'front' of a split-firewood stacking machine 20 in accordance with the invention. While referred to herein as the 'front' end, this end is more accurately the output end.

The split-firewood stacking machine 20 comprises a fixed base 22 carrying a frame drum 24 for rotation about a horizontal axis. The frame drum 24 comprises front and back annular frames 24 and 26 that have about a six foot (~1.8 m) inner diameter and about a seven and one-half foot (~2.3 m) outer diameter. The drum 24 is spun by a drive system 30 which is powered by an electric motor 32 mounted on the 'right' side of the base 22 (eg., 'right' according to the perspective of FIG. 2).

As FIG. 1 shows better, the drum 24 comprises a sidewall 34 that stretches between the front and back annular frames 24 and 26. As FIG. 2 shows better, the drum sidewall 34 has a repetitious series of flights 40 attached to it. The sidewall 34 together with the flights 40 resemble an internal ring gear. The front and back annular frames 24 and 26, the sidewall 34, and flights 40 turn in unison about a the generally horizontal rotation axis.

FIG. 2 also shows better the drive system 30 for the drum 24. The drum 24 floats on left and rights sets of a front and back pair of spaced idler tires 42 (only the front tire of each of the left and right sets shown in view in FIG. 2, wherein the rear tires are hidden from view immediately behind the front tires). These tires 42 may comprise inflatable wheelbarrow tires or the like. The left and right sets of tires 42 are in rolling contact against the drum 24 at about the eight o'clock position and four o'clock position, respectively. The electric motor 32 turns a gear box (not shown) which reduces the input spin speed of the electric motor 32 to a relatively slow output speed for a drive pulley 44. The drive pulley 44 drives a drive belt 46 which is looped around the outside of the drum sidewall 34. Hence the electric motor 32 powers the spinning of the drum 24. To date, the preferred operational speed is just a few rotations per minute.

Referring again to FIGS. 1 and 2 together, split-firewood stacking machine 20 in accordance with the invention further comprises a front and back cover 50 and 52, a ramp 54 as well as a chute 56, all which do not rotate with the drum 24.

The drum sidewall 34 has an axial span (ie., the measure between the front and back frames 24 and 26) which is chosen according to the length of the sticks 60 the drum 24 is intended to handle. Nominal stick lengths of split firewood can vary according to end use, and, typically vary between twelve inches (~0.1 m) and thirty-six inches (~1 m) in length. The axial span of this drum sidewall 34 is sized (for sake of a non-limiting example) to tumble sticks 60 of split firewood that are nominally sixteen inches (~0.13 m) in length. Hence the axial span of the drum sidewall 34 will be designed to handle slightly over-sized sticks 60, and might be given an axial span of between seventeen and eighteen inches (~0.14 and 0.15 m).

Figure 3:
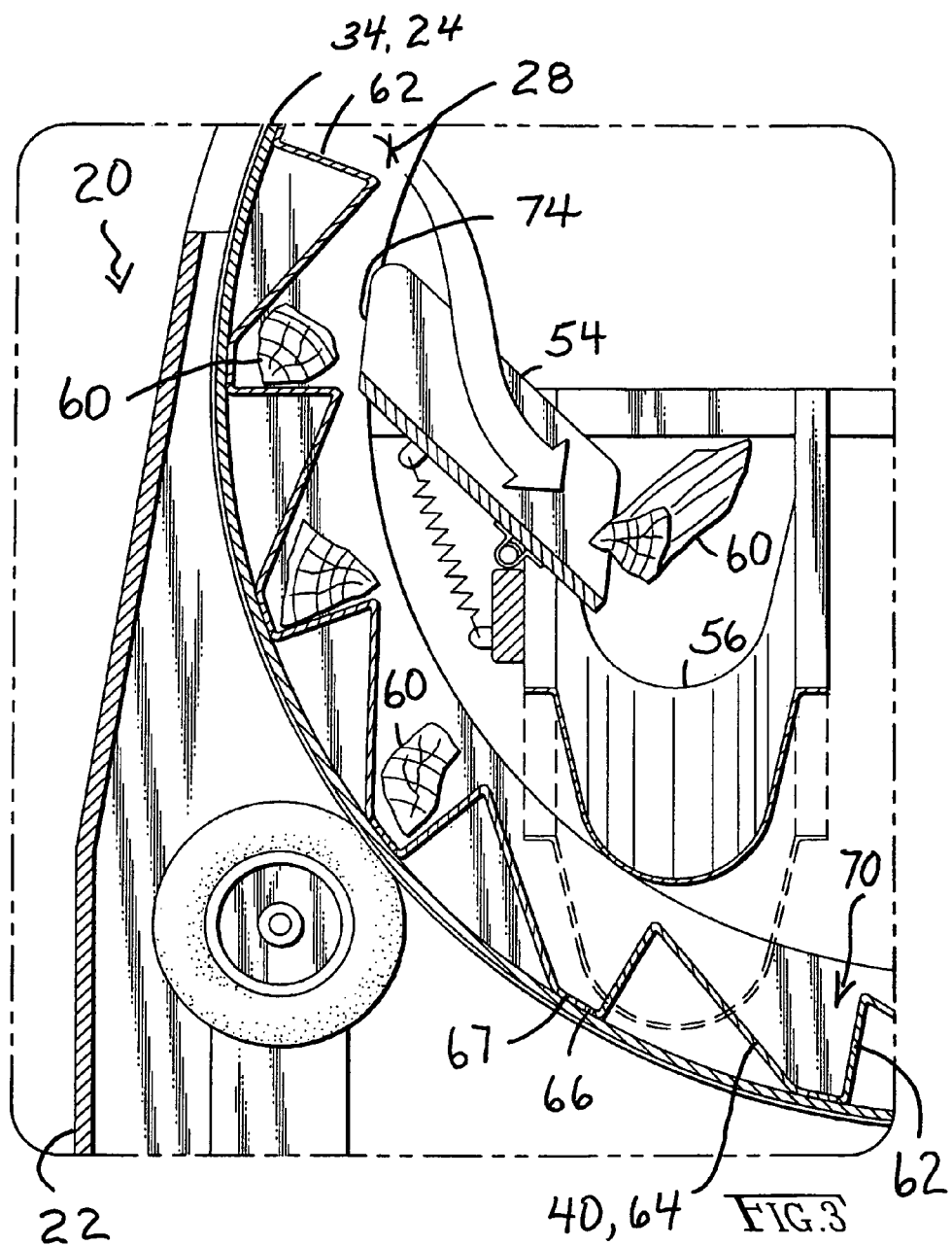
FIG. 3 is an enlarged-scale section view of detail in FIG. 2.
Figure 4:
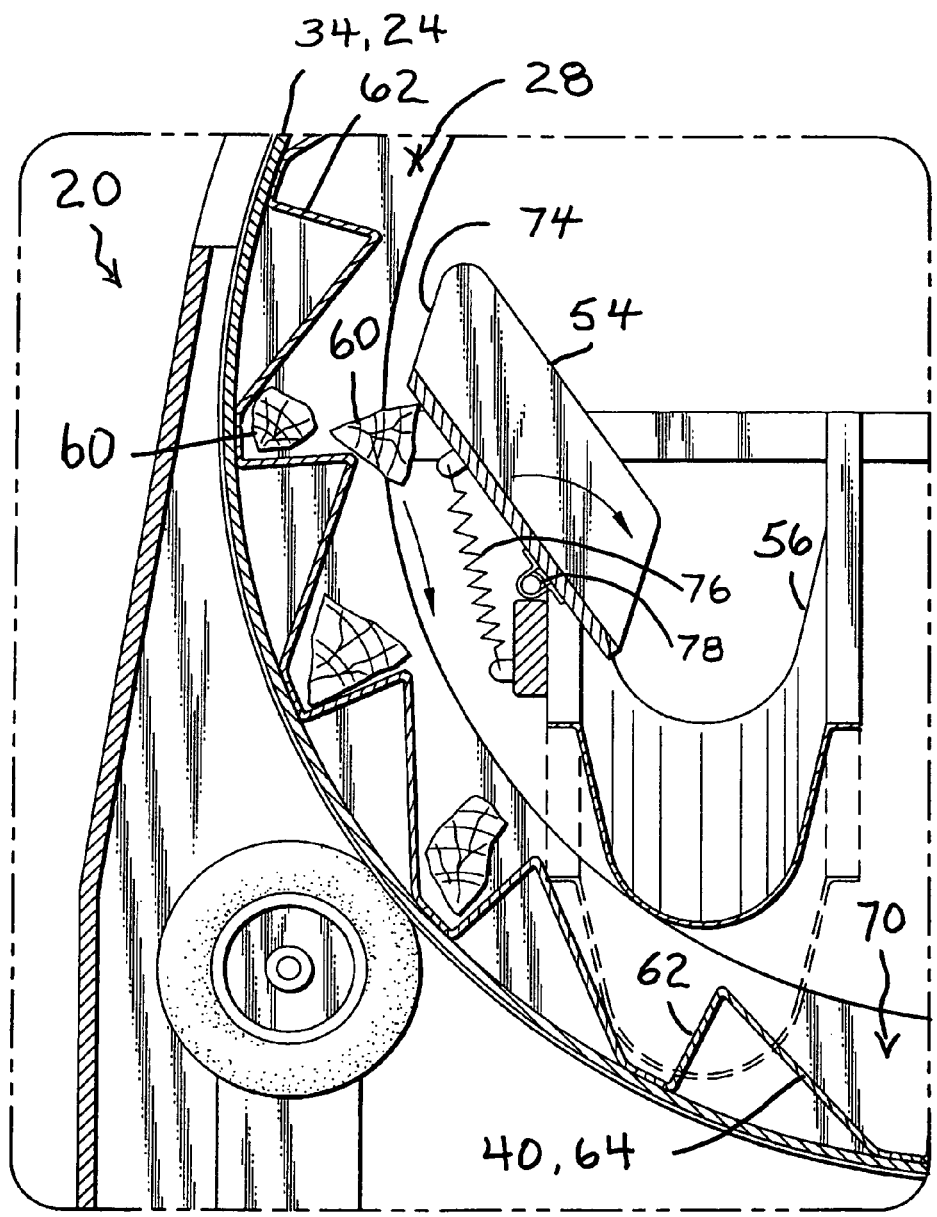
FIG. 4 is a section view comparable to FIG. 3 except showing the ramp flip up in order to avoid damage.

FIGS. 3 and 4 are close-up view of what is shown in FIG. 2, except on an enlarged scale. FIGS. 3 and 4 prominently shows the ramp 54 and several of the flights 40 of the drum 24. The inside of the drum sidewall 34 is studded with an endless succession of these flights 40. One exemplary, non-limiting design for the flights 40 is to make them out of folded sheet metal (or light gauge plate steel). Another exemplary, non-limiting design for the flights 40 is to make each one individually, and then fasten the flights 40 to the drum sidewall 34 in head to tail fashion to give the appearance of an endless ring.

Each flight 40 comprises an abbreviated shelf portion 62 joined to an elongated apron portion 64, which together are flanked by a diminutive leading flange 66 and a counter-part diminutive trailing flange 67. The diminutive flanges 66 and 67 provide relatively thin strips of axially-extending material in which to run a series of fasteners (not shown). The fasteners fasten the flights 40 to the sidewall 34. In a prototype of machine 20 in accordance with the invention, the drum sidewall 34 was produced of rolled plywood. The fasteners comprised wood screws.

The flights 40 are fastened to the sidewall 34 in such head-to-tail fashion that the leading flange 66 of any given flight 40 essentially abuts against the trailing flange 67 of the flight 40 ahead of it.

Hence the flanges 66 and 67 more or less merge into a seamless unit. Again, the flights 40 are affixed to the drum sidewall 34, 'head-to-tail' so to speak. The leading flange 66 of one flight 40 is nearly abutted right up to the trailing flange 66 of the flight 40 ahead of it, and so on all the way around the drum sidewall 34.

More particularly, each flight 40 comprises the sheet-metal leading flange 66, which transitions into the sheet-metal shelf portion 62 at a first fold line, which transitions into the sheet-metal apron portion 64 at a second fold line, which transitions into the trailing flange 67 at a third fold line.

Two such flights 40 form a pocket 70. The pocket 70 is characterized by one shelf portion 62 (which is from a following flight 40), one apron portion 64 (which is from the flight 40 ahead of the following flight 40), and a pocket outer wall 66-67 (which is the merger of the leading and trailing flange 66 and 67, respectively, of the following flight 40 and flight 40 ahead of the following flight 40).

In use, a jumble of sticks 60 of split firewood are fed into the open bottom of the turning drum 24. For example, the sticks 60 might be fed by a conveyor 72 into the input end of the open drum 24, to fall in a heap in the bottom of the drum 24. The pocket 70 serves to scoop out and lift a (presumably single) stick 60 of split firewood from the tumbling heap in the bottom of the drum 24. The apron portion 64 serves as a slide for sending sticks 60 into the pocket 70. When the pocket 70 rotates from the seven o'clock position on toward the eight o'clock position, the stick 60 transfers from resting predominantly on the pocket outer wall 66-67 to predominantly on the shelf portion 62.

The shelves 62 of six such flights 40 are in view in FIG. 3, one of which is above the elevation of the ramp 54, another which is about level with an upper edge 74 of the ramp 54 (and there are four more flights 40 below those two flights 40 as well in FIG. 3, but the rest are outside the view).

For the shelf 62 about level with the upper edge 74 of the ramp 54, this shelf 62 is indeed carrying one stick 60 of split firewood. It is a non-exclusive design preference that the shelf width is intentionally designed to be wide enough to steadily carry just one stick 60 of split firewood thereon, and not two. If a second stick 60 would try to hang on the very edge of a shelf 62, the shelf 62 is narrow enough such that the second stick 60 would fall off and slide down the apron 64 before the shelf 62 ever ascended above the elevation of the ramp 54. Indeed, it would be preferred if the upper edge 74 of the ramp 54 would be the final insurance to ensure one stick 60 per shelf 62, and scrape off any second sticks 60 that are managing to hang on.

In FIG. 3, the flights 40 travel up in this view. The shelf 62 about level with the upper edge 74 of the ramp 54 has carried one stick 60 of firewood to about the nine o'clock position. As that flight 40 travels upward to the about the ten o'clock position, it will rotate above the elevation of the upper edge 74 of the ramp 54, and its shelf 62 will begin to tip at a continually steepening angle. Eventually, that one stick 60 of firewood will slide off the shelf 62 and land on the ramp 54 (as shown).

FIG. 3 shows that the flight 40 below the elevation of the ramp 54 is also loaded with one stick 60 of firewood. The shelf 62 of that flight 40 is indexed to about the eight o'clock position. Indeed, that stick 60 of firewood has to travel through an arc behind the upper end of the ramp 54. That stick 60 is still safely nestled on the shelf 62 and against the pocket outer wall 66-67, and shall safely remain there until the shelf 62 indexes to the ten o'clock position or higher.

FIG. 4 shows how the upper edge 74 of the ramp 54 tends to enforce the operational preference for one stick 60 per pocket 70. Experience has taught that, as these shelves 62 swing through the eight o'clock position to the ten o'clock position (and behind the upper edge 74 of the ramp 54), now and then, a stick 60 of firewood gets jammed against the upper edge 74 of the ramp 54.

Typically this happens when two sticks 60 which are just a little thinner than the general population of sticks 60 manage to be scooped up in one pocket 70 after all.

The outer stick 60 typically extends off the shelf 62 to such an extent as to jam into the ramp 54 from the underside of the upper edge 74 (as shown).

Alternatively, a single stick 60 might every now and then ride on a shelf 62 in an askew orientation. During test trials, the upper edge 74 of the ramp 54 was fixed. An askew stick 60 of firewood could almost pop the ramp 54 off at the upper edge 74 thereof. Hence FIG. 4 shows one design solution to this discovery. Now, the upper edge 74 of the ramp 54 is no longer fixed but biased by a spring 76 to pivot about a pivot pin 78 to tip up safely out of the way of an askew stick 60 of firewood.

FIG. 3 shows that the stick 60 dumped off the shelf 62 in the now near ten o'clock position has by this time slid down the ramp 54 and is proceeding to land in the chute 56. FIG. 1 shows the front and back covers 50 and 52 of the machine 20 assembled in place. These covers 50 and 52 are half circles and cover the left half of the front and back open ends of the machine 20. The drum 24 turns such that its flights 40 orbit its horizontal spin axis. The left half of the orbit can be reckoned as the up run, the right half as the down or return run. The flights 40 predominantly do the work of carrying sticks 60 of firewood between about the five o'clock position to the ten o'clock position.

The back cover 52 preferably comprises a 'solid' half circle. In contrast, preferably the front cover 50 has a discharge opening 82 through it in its lower half, and out protrudes an extension of the chute 56.

Pause can be taken now to consider use of the machine 20. FIG. 1 shows the feed conveyor 72 feeding a supply of randomly-oriented sticks 60 of split firewood for dumping into the bottom of the drum 24. The sticks 60 land in heaps or piles and the like in the bottom of the drum 24, such that the separate sticks 60 land in random orientations.

It is preferred to load the drum 24 with sticks 60 such that a bottom quarter of the drum 24 (eg., from about the five o'clock position to about the eight o'clock position) is covered with a heap of sticks 60. The flights 40 continually pass under the pile or heap of sticks 60.

As a flight 40 climbs out from under the pile of sticks 60, somewhere where its shelf 62 is at about the eight o'clock position, the flight 40 should emerge free with a single stick 60 scooped up on its shelf 62, and as shown better by FIG. 3. Again, FIG. 3 shows that, the flights 40 which have emerged out from under the pile at about the eight o'clock position do indeed have one stick 60 apiece scooped up on each's shelf 62.

FIG. 3 furthermore shows that, every time a flight 40 loaded with a stick 60 of firewood orbits past the nine o'clock position and to about the ten o'clock position, it dumps its load of the single stick 60 onto the ramp 54. The stick 60 might slide one end first, or laterally. Either way, the stick 60 drops into the crosswise chute 56. The chute 56 has a generally U-shaped cross-section. If the stick 60 successfully lands in the crosswise chute 56, the stick 60 then orients itself, sliding one end first down the trough of the chute 56.

FIG. 1 shows one stick 60 sliding one end first down the chute 56's extension through the front cover 50. The stick 60 is oriented in the intended orientation for it, and as according to design. FIG. 1 also shows that an earlier stick 60 has landed to rest in a collection bin 84 for it at the end of the chute 56 extension. Preferably, the bin 84 is indexed back and forth left and right by an outflow conveyor 86 to catch the sticks 60 in a neat stack. Additionally, the bin 84 might be vertically indexed as well to further ensure neat stacking (this is not shown). Alternatively, the sticks 60 might be stacked on end in a five gallon bucket or the like (as shown in the priority provisional application, but not in the drawings here). Preferably, once such a stack has been collected, such a stack can be advanced to a bundling machine 20 or the like (not shown)

as for wrapping the bundle of neatly stacked sticks 60 in shrink wrap or the like for shipping in commerce in that form.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. Apparatus for accepting an input of randomly-oriented sticks of split-firewood which are fairly uniform in nominal diameter and outputting neat stacks thereof, said apparatus comprising:
   a drum mounted to rotate about a generally horizontal axis, and extending axially between spaced ends, one which comprises an output end;
   a drive system to rotate the drum;
   said drum comprising a sidewall provided with a procession of flights on an inner periphery thereof and partitioning said sidewall's inner course with a procession of shelves and pockets;
   each shelf extending axially between the spaced ends of the drum and radially between, the drum sidewall and an inner edge thereof;
   a ramp which does not rotate with the drum being mounted inside the drum and comprising an axially extending upper edge disposed to be spaced by a diminutive radial gap from the inner edge of the shelves at about the 9 o'clock position relative clockwise rotation of the drum to form a landing zone for sticks sliding off shelves rotating above 9 o'clock;
   said ramp sloping from the upper edge to a lower edge radially deeper inside the drum; and
   a chute which does not rotate with the drum extending and sloping from an upper end to a lower discharge end, said chute being mounted with the upper end inside the drum and underneath lower edge of the ramp to form a catch zone for sticks sliding off the ramp inside the drum, said chute furthermore extending out of the output end of the drum and adapted to discharge sticks of split firewood in neat stacks outside the drum;
   wherein said shelves have a radial width designed to be wide enough to steadily carry just one stick of split firewood thereon, and not two;
   wherein the radial gap from the inner edge of the shelves to the upper edge of the ramp is sized to promote the ramp's upper edge to scrape off any second stick on a shelf, if any; and
   wherein the ramp is pivotally attached about a pivot axis generally parallel with the drum's rotational axis, and biased by a spring to hold the upper edge in down position, whereby and passing second sticks on a shelf lift the upper edge against the spring.

2. The apparatus of claim 1, wherein:
   the pockets have an angular contour and spacing adapted to promote single stick occupancy therein, and not two.

3. The apparatus of claim 1, further comprising:
   a bin for the chute to discharge sticks to in neat stacks of horizontal sticks.

4. The apparatus of claim 1, further comprising:
   an outflow conveyor for the chute to discharge sticks to in a neat registry of horizontal sticks.

5. The apparatus of claim 1, further comprising:
   an open-topped container for the chute to discharge sticks to, standing on end, in a neat bundle of vertical sticks.

6. Apparatus for accepting an input of randomly-oriented sticks of split-firewood and outputting neat stacks thereof, said apparatus comprising:
   a drum mounted to rotate about a generally horizontal axis, and extending axially between spaced ends, one which comprises an output end;
   a drive system to rotate the drum;
   said drum comprising a sidewall provided with a procession of flights on an inner periphery thereof and partitioning said sidewall's inner course with a procession of shelves and pockets;
   each shelf extending axially between the spaced ends of the drum and radially between the drum sidewall and an inner edge thereof;
   a ramp which does not rotate with the drum being mounted inside the drum and comprising an axially extending upper edge disposed to be spaced by a diminutive radial gap from the inner edge of the shelves at about the 9 o'clock position relative clockwise rotation of the drum to form a landing zone for sticks sliding off shelves rotating above 9 o'clock;
   said ramp sloping from the upper edge to a lower edge radially deeper inside the drum; and
   a chute which does not rotate with the drum extending and sloping from an upper end to a lower discharge end, said chute being mounted with the upper end inside the drum and underneath lower edge of the ramp to form a catch zone for sticks sliding off the ramp inside the drum, said chute furthermore extending out of the output end of the drum and adapted to discharge sticks of split firewood in neat stacks outside the drum;
   wherein the shelves comprise shelf portions of a procession of flights provided around the inside periphery of the drum sidewall;
   wherein each flight is an single unit of construction, providing one shelf portion per flight; and
   wherein the flights comprise a folded sheet metal or light gauge plate steel construction, and are attached to the drum sidewall, in head to tail fashion whereby giving the appearance of an endless ring.

7. The apparatus of claim 6, wherein:
   wherein the drum sidewall comprises rolled plywood and the flights are attached by wood screws.

8. The apparatus of claim 6, wherein:
   each flight comprises the sheet-metal leading flange, which transitions into the sheet-metal shelf portion at a first fold line, which transitions into the sheet-metal apron portion at a second fold line, which transitions into the trailing flange at a third fold line.

9. Apparatus for accepting an input of randomly-oriented sticks of split-firewood and outputting neat stacks thereof, said apparatus comprising:
   a drum mounted to rotate about a generally horizontal axis, and extending axially between spaced ends, one which comprises an output end;
   a drive system to rotate the drum;
   said drum comprising a sidewall provided with a procession of flights on an inner periphery thereof and partitioning said sidewall's inner course with a procession of shelves and pockets;
   each shelf extending axially between the spaced ends of the drum and radially between the drum sidewall and an inner edge thereof;
   a ramp which does not rotate with the drum being mounted inside the drum and comprising an axially extending upper edge disposed to be spaced by a diminutive radial gap from the inner edge of the shelves at about the 9 o'clock position relative clockwise rotation of the drum to form a landing zone for sticks sliding off shelves rotating above 9 o'clock;

said ramp sloping from the upper edge to a lower edge radially deeper inside the drum; and a chute which does not rotate with the drum extending and sloping from an upper end to a lower discharge end, said chute being mounted with the upper end inside the drum and underneath lower edge of the ramp to form a catch zone for sticks sliding off the ramp inside the drum, said chute furthermore extending out of the output end of the drum and adapted to discharge sticks of split firewood in neat stacks outside the drum;

wherein the shelves comprise shelf portions of a procession of flights provided around the inside periphery of the drum sidewall;

wherein each flight is an single unit of construction, providing one shelf portion per flight;

wherein each flight comprises an abbreviated shelf portion joined to an elongated apron portion which together are flanked by a diminutive leading flange and a counterpart diminutive trailing flange; and wherein the flights are fastened to the sidewall in such a head-to-tail fashion that the leading flange of any given flight essentially abuts against the trailing flange of the flight ahead.

10. Apparatus for accepting an input of randomly-oriented sticks of split-firewood and outputting neat stacks thereof, said apparatus comprising:

a drum mounted to rotate about a generally horizontal axis, and extending axially between spaced ends, one which comprises an output end;

a drive system to rotate the drum;

said drum comprising a sidewall provided with a procession of flights on an inner periphery thereof and partitioning said sidewall's inner course with a procession of shelves and pockets;

each shelf extending axially between the spaced ends of the drum and radially between the drum sidewall and an inner edge thereof;

a ramp which does not rotate with the drum being mounted inside the drum and comprising an axially extending upper edge disposed to be spaced by a diminutive radial gap from the inner edge of the shelves at about the 9 o'clock position relative clockwise rotation of the drum to form a landing zone for sticks sliding off shelves rotating above 9 o'clock;

said ramp sloping from the upper edge to a lower edge radially deeper inside the drum;

a chute which does not rotate with the drum extending and sloping from an upper end to a lower discharge end, said chute being mounted with the upper end inside the drum and underneath lower edge of the ramp to form a catch zone for sticks sliding off the ramp inside the drum, said chute furthermore extending out of the output end of the drum and adapted to discharge sticks of split firewood in neat stacks outside the drum; and front and back covers, which do not rotate with the drum, for partly covering the input and output ends of the drum and preventing spill out of the sticks of firewood while tumbling in the drum, whereby a supply of randomly-oriented sticks of split firewood dumped into drum cover about a bottom quarter of the drum, from about the five o'clock position to about the eight o'clock position, with the shelves continually passing underneath the pile or heap of sticks, and whereby as the shelves climb out from under the pile of sticks, shelves most times will emerge at about the eight o'clock position with a single stick scooped up thereon, which as the shelf orbits past nine o'clock position to the ten o'clock position, dumps the single stick onto the ramp, which lands in the crosswise chute, and then discharges over the discharge end.

11. The apparatus of claim 10, wherein:

the drum comprises a frame drum construction, with front and back annular frames flanking the drum sidewall.

12. The apparatus of claim 10 wherein the drum rotates clockwise from the perspective of the output end.

* * * * *